(12) United States Patent
Ra et al.

(10) Patent No.: US 7,627,576 B2
(45) Date of Patent: Dec. 1, 2009

(54) DATABASE SYSTEM MONITORING METHOD WITHOUT CONNECTING THE DATABASE SYSTEM

(75) Inventors: Jang Keon Ra, Seoul (KR); Bum Kim, Seoul (KR)

(73) Assignee: Warevally Co., Ltd. (KR)

( * ) Notice: Subject to any disclaimer, the term of this patent is extended or adjusted under 35 U.S.C. 154(b) by 679 days.

(21) Appl. No.: 10/536,174

(22) PCT Filed: Oct. 22, 2003

(86) PCT No.: PCT/KR03/02234

§ 371 (c)(1),
(2), (4) Date: Feb. 6, 2006

(87) PCT Pub. No.: WO2004/042621

PCT Pub. Date: May 21, 2004

(65) Prior Publication Data

US 2006/0167973 A1    Jul. 27, 2006

(30) Foreign Application Priority Data

Nov. 8, 2002 (KR) ...................... 10-2002-0069132

(51) Int. Cl.
*G06F 7/00* (2006.01)
*G06F 11/00* (2006.01)
*G06F 11/30* (2006.01)
*G06F 12/14* (2006.01)
*G06F 12/16* (2006.01)
*G06F 15/173* (2006.01)
*G06F 17/00* (2006.01)
*G21C 17/00* (2006.01)
*G08B 23/00* (2006.01)

(52) U.S. Cl. .................. 707/9; 702/182; 707/104.1; 709/223; 709/224; 726/23

(58) Field of Classification Search ............... 702/182; 707/9, 104.1; 726/23; 709/223, 224
See application file for complete search history.

(56) References Cited

U.S. PATENT DOCUMENTS

| | | | |
|---|---|---|---|
| 6,009,428 A * | 12/1999 | Kleewein et al. ............... 707/10 |
| 6,446,028 B1 * | 9/2002 | Wang ........................ 702/186 |
| 6,714,931 B1 * | 3/2004 | Papierniak et al. ............ 707/10 |
| 2004/0054928 A1 * | 3/2004 | Hall ......................... 713/201 |
| 2004/0090923 A1 * | 5/2004 | Kan et al. ................... 370/252 |

* cited by examiner

*Primary Examiner*—James Trujillo
*Assistant Examiner*—Jorge A Casanova
(74) *Attorney, Agent, or Firm*—Tutunjian & Bitetto, P.C.

(57) ABSTRACT

This disclosure relates to methods for monitoring a database system without access to the database system, wherein when data packets between a plurality of operating servers including the database system and a plurality of client application processes are sent and/or received through a SQL net protocol or BEQ protocol, the data packets are collected through sniffing by a monitoring process or through a separate pipe gateway process thereby SQL information and database performance information transmitted between the operating servers and the client application processes are extracted. The SQL information and database performance information can be effectively monitored with no load or minimized load to the database, operating server and network.

18 Claims, 5 Drawing Sheets

DATABASE SYSTEM MONITORING METHOD WITHOUT CONNECTING THE DATABASE SYSTEM

BACKGROUND OF THE INVENTION

1. Field of the Invention

The present invention relates to a method for monitoring a database system without access to the database system, in particular to a method for monitoring a database system without access to the database system, wherein every SQL (Structured Query Language) existing on an IPC pipe between a plurality of operating servers including databases and a plurality of client application processes is extracted, analyzed and recorded, such that all SQL information and database performance information are monitored with no load or minimized load to the database and the network system.

2. Description of the Related Art

Generally, an information processing system consists of a plurality of operating servers, each including a database, a plurality of client terminals connected to the database of the operating server using a SQL net protocol, and a firewall for protecting information in the information processing system, etc. The information processing system uses a broadcasting network connected by Ethernet, etc. Further, the database generally includes a DBMS (DataBase Management System), and the SQL includes standardized user program language and interfaces for a Relational DBMS (RDBMS) as provided by ORACLE™. Hereinafter, database system means ORACLE™ database and database management system (DBMS or RDBMS).

Generally, in the abovementioned information processing system, if application programs of the client terminal access the database system, the DBMS dynamically creates numerous data related to performance of the database and stores the data to a certain area of the memory. Especially, performance data of database created by ORACLE™ DBMS (or RDBMS) are classified in database level, session level and SQL level, and each classified datum is stored in a data dictionary allocated on the memory space for a certain time.

Therefore, prior methods (or tools) for monitoring database access directly to the memory of the database or the DBMS (RDBMS) monitor the performance data of the database. However, these types of methods or tools have a problem in that loads are applied to the database system and the network or the operating server in the information processing system during monitoring performance data. Further, by using above-mentioned prior methods for monitoring the database, it is nearly impossible to monitor information of every SQL in the information processing system, which may process thousands or tens of thousands of transactions per second.

SUMMARY OF THE INVENTION

It is an object of the present invention to provide a method for monitoring a database system without access to the database system, wherein data packets existing on a network, a loopback device and a IPC pipe between a plurality of operating server including a database system and a plurality of client application process are collected without access to the database system, all SQL information and database performance information is extracted from the collected data packets, and therefore every SQL information and database performance information is monitored effectively with no load or minimized load to the database, the operating server and the network system.

To accomplish the above object, the method for monitoring a database system without access to the database system according to the present invention is characterized in that when data packets between a plurality of operating servers including the database system and a plurality of client application processes are sent and/or received through a SQL net protocol, the data packets are collected through sniffing by a monitoring process thereby the SQL information and database performance information transmitted between the operating servers and the client application processes are extracted.

Preferably, the sniffing collects the data packets using the SQL net protocol, and is performed on an Ethernet network between the database system and the client application processes.

The sniffing collects the data packets using the SQL net protocol, and is performed on a loopback device between the database system and the client application processes.

The monitoring process comprises the steps of: determining whether a network adapter to be monitored is a loopback device; performing a sniffing mode if the network adapter is the loopback device; setting "promiscuous=TRUE" and performing the sniffing mode if the network adapter is not the loopback device; determining whether the program is to be terminated; determining whether the direction of the data packets is from the client application process to the operating server if the program is not to be terminated; extracting the SQL information if the direction of the packets is from the client application process to the operating server; and extracting the database performance information if the direction of the packets is not from the client application process to the operating server.

Preferably, the monitoring process is implemented in a separate monitoring system or operating server.

The SQL information may include SQL log information having data defining language (DDL), data manipulating language (DML), data control language (DCL), PLSQL and query.

The SQL information preferably includes session information such as user IP, user name, user application program, and used time of the client application process accessing the database system and host name of the operating server, and the SQL log information by session information and instance.

The database performance information preferably includes data of mean response time and processing time between the database system of the operating server and the client application process, and database performance statistics by instance.

The database system is preferably an ORACLE™ database and an ORACLE™ database management system.

Further, to accomplish the above object, a method for monitoring a database system without access to the database system according to the present invention is characterized in that when data packets between a plurality of operating servers including the database system and a plurality of client application processes are sent and/or received through a BEQ protocol, the data packets are collected by a separate pipe gateway process thereby SQL information and database performance information transmitted between the operating servers and the client application processes is extracted.

EXPLANATION FOR REFERENCE NUMERIC TO MAJOR PARTS OF THE DRAWINGS

1: information processing system
10: operating server
12: loopback device
13: IPC pipe
20: database system
30: client terminal

DETAILED DESCRIPTION OF THE INVENTION

Figure 1:
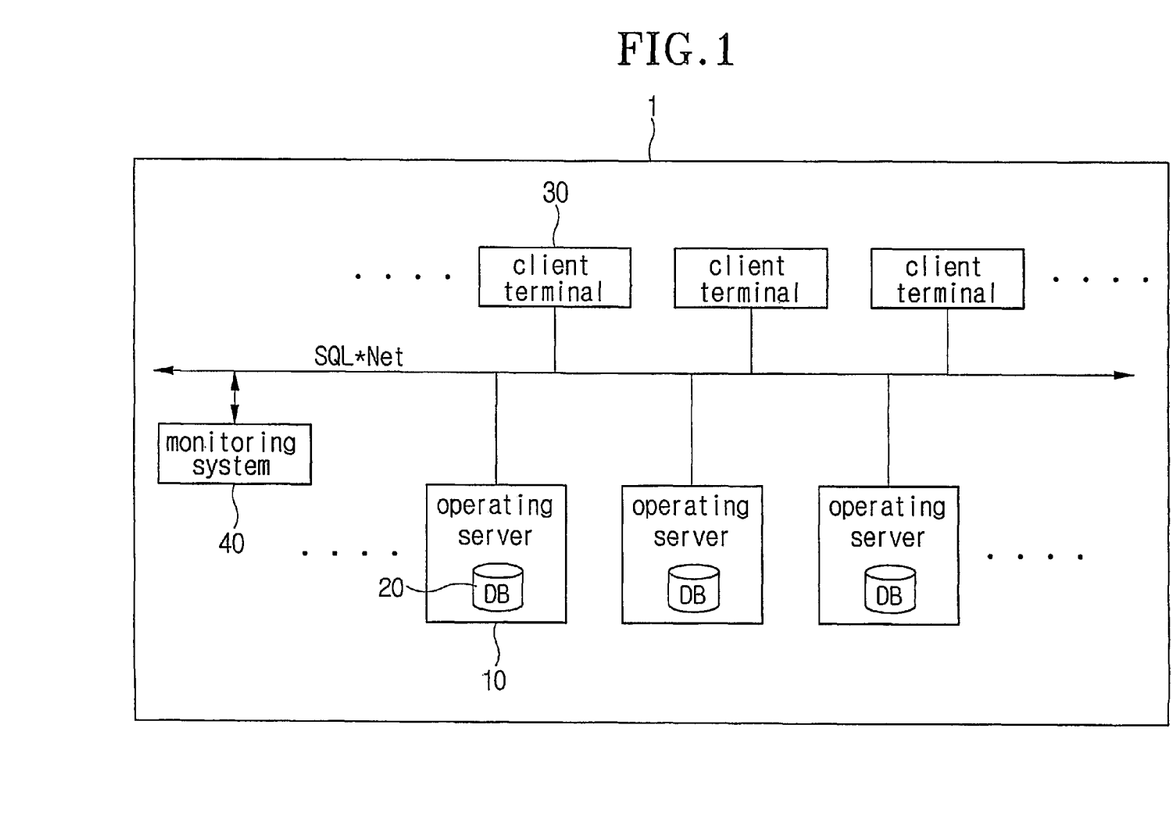
FIG. 1 is a schematic diagram showing an information processing system adapted to apply a method for monitoring a database according to an embodiment of the present invention.

FIG. 1 is a schematic diagram showing an information processing system adapted to apply the method for monitoring a database according to an embodiment of the present invention. Namely, the information processing system 1 to which the method for monitoring a database according to the present invention includes a plurality of operating servers 10 and a plurality of client terminals 30 interconnected via an Ethernet network, a loopback device or an IPC pipe, in which the operating servers 10 include a database system 20. The database system 20 to which the present invention is applied may be an ORACLE™ database and database management system (DBMS or RDBMS), and may include components (ORACLE™ data file, Instance, ORACLE™ Shadow Process, Listener etc.) for operating the ORACLE™ database and DBMS (or RDBMS). Other databases and management systems may also be employed. Communication between the database system 20 and the client terminals 30 may be implemented via an SQL net protocol or a BEQ protocol. Therefore, the monitoring process according to a method for monitoring a database of the present invention is realized in a separate monitoring system 40 or the operating servers 10. The method collects data packets sent and/or received via the SQL net protocol or the BEQ protocol, and extracts SQL information and database performance information. The client terminals 30 may include a physical client terminal and client application programs or application processes executed in the client terminals 30.

FIGS. 2 to 5 are block diagrams for explaining the method for monitoring a database according to the present invention.

Figure 2:
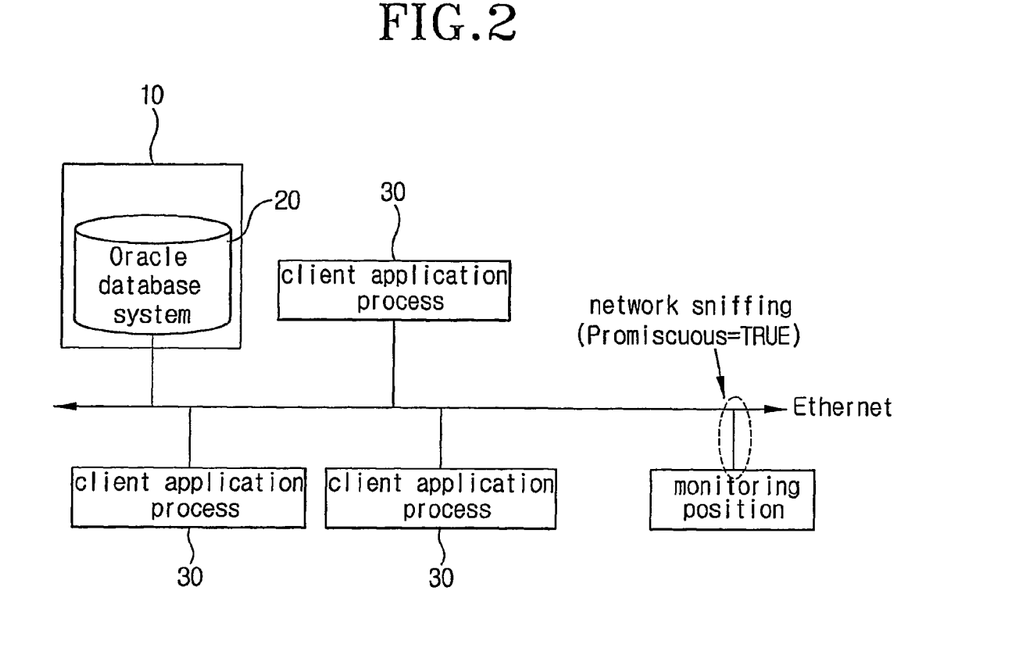
FIG. 2 is a block diagram for explaining a method for monitoring a database system on an Ethernet network according to an embodiment of the present invention.

First, FIG. 2 is a block diagram for explaining an illustrative method for monitoring a database system on an Ethernet network. As shown in the drawing, in the case that the client application processes 30 access the ORACLE database system 20 in the operating server via a network device on the Ethernet, the method for monitoring the database according to the present invention extracts and analyses SQL net packets broadcasted on the Ethernet network by network sniffing, reserves every SQL between every client application process 30 and database system 20, then extracts performance information from the measured monitoring item. Namely, a network sniffing technique provided in the present invention uses the fact that all packets on the Ethernet are broadcasted. When packets are sent and/or received by a SQL net protocol between database system 20 and clients 30, these packets are broadcasted on the same network. Therefore the monitoring system 40 of the present invention can collect every broadcasted packet by setting the network access mode to "Promiscuous=TRUE" on the same network as the network on which the database system 20 is located. The contents sent and/or received between each client 30 and database system 20 are divided properly by analyzing these collected packets, then the monitoring step is implemented (see, FIG. 6a).

Figure 3:
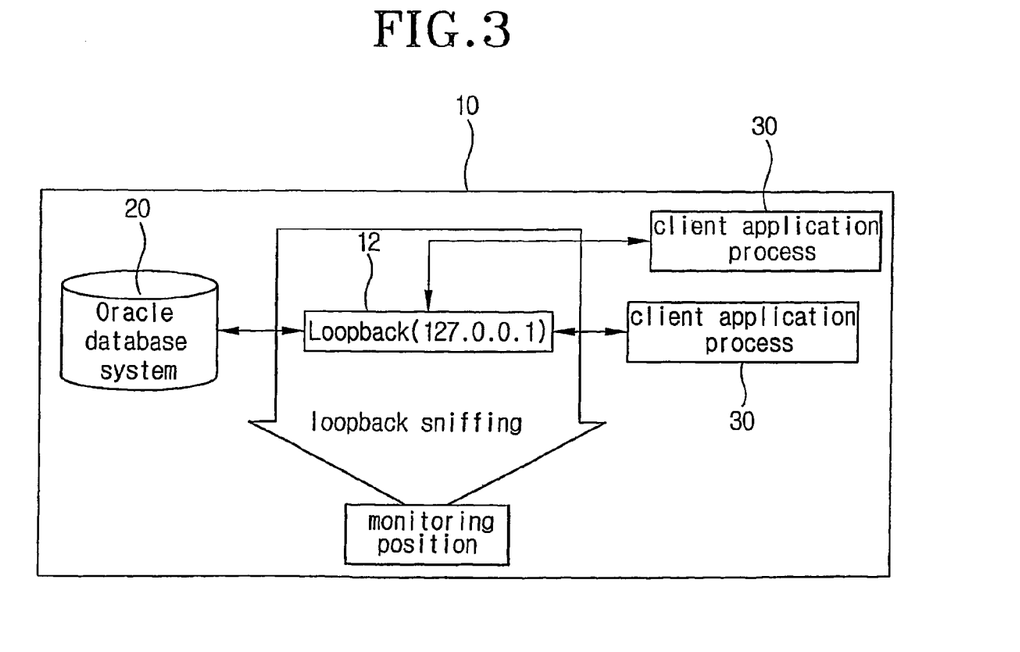
FIG. 3 is a block diagram for explaining a method for monitoring a database system on a loopback device according to an embodiment of the present invention.

FIG. 3 is a block diagram for explaining a method for monitoring a database on a loopback device. In the case of monitoring on the loopback device 12, the method according to the present invention extracts and analyses SQL net protocol information created at the loopback device (e.g., Internal Network Device, 127.0.0.1: 12) in the operating server 10 on which the database system 20 exists by sniffing, reserves any SQL between every client application processes 30 and the database system 20, then extracts performance information from the measured monitoring item. Namely, the loopback sniffing technique provided in the present invention is implemented by setting loopback access. mode on the loopback device 12 to a sniffing mode and thereby extracting packets sent and/or received by the SQL net protocol between clients executed in the operating server 10. The contents sent and/or received between each client 30 and database system 20 are divided properly by analyzing these collected packets, then the monitoring step is implemented (see FIG. 6a).

The sniffing according to the present invention collects every data packet by setting the sniffing mode and thereby omitting a filtering step in communications using the SQL net protocol. Every piece of SQL information and database performance information for inner auditing of the information processing system 1 and measuring performance of the database system 20 is extracted from the collected data packets. Further, a method for monitoring databases on the Ethernet network or the loopback device 12 according to the present invention may be implemented through a separate monitoring system 40 or executed in the operating server 10.

Figure 4:
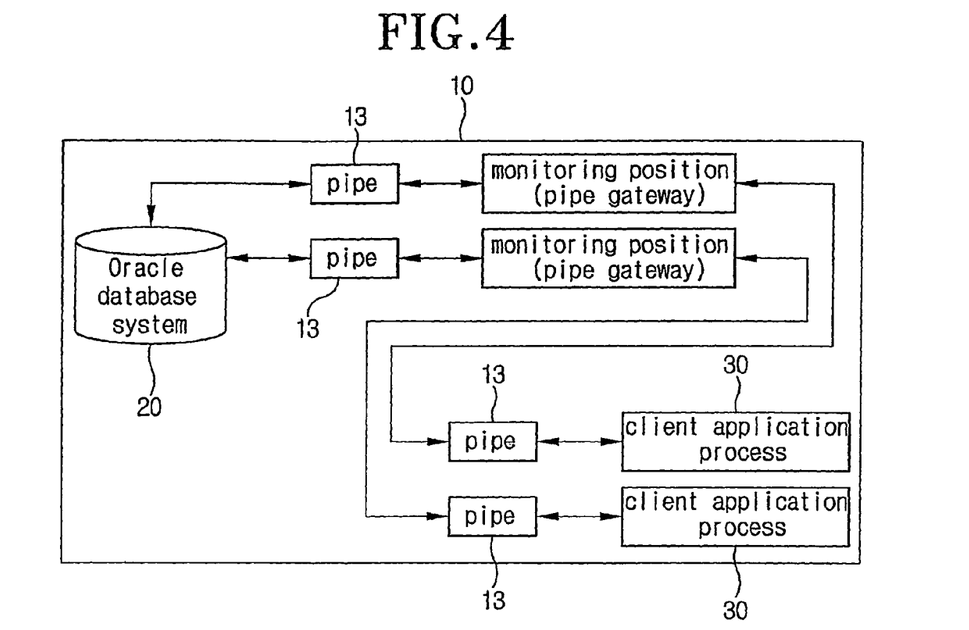
FIGS. 4 and 5 are schematic diagrams for explaining a method for monitoring database system on an IPC pipe according to an embodiment of the present invention.
Figure 5:
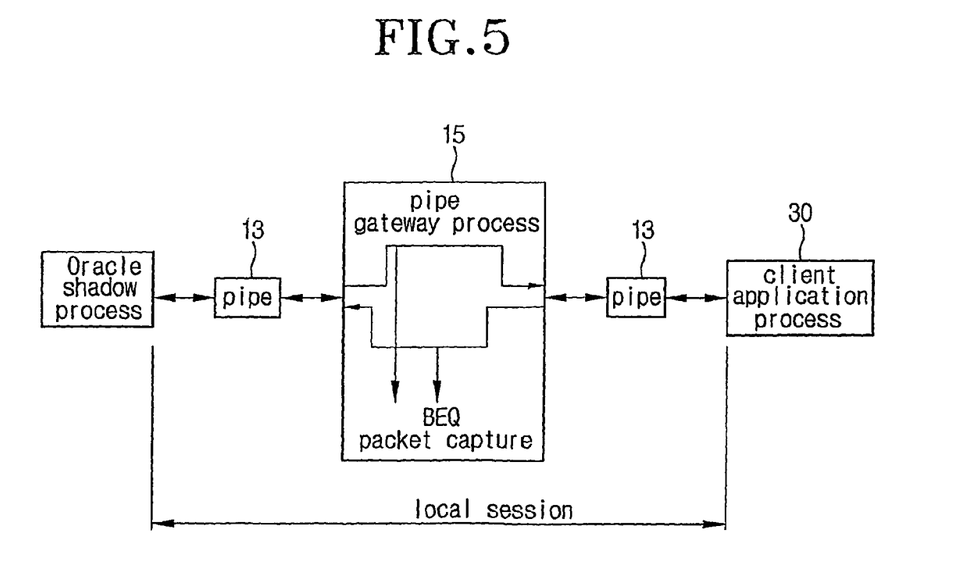

FIGS. 4 and 5 are schematic diagrams for explaining the method for monitoring database system on an IPC pipe according to an embodiment of the present invention.

In the case that client application processes 30 are connected via IPC pipe 13 to the database system 30, the method according to the present invention extracts and analyses the BEQ protocol information created in the IPC (Inter Process Communication-Pipe) device, reserves any SQL between every client application processes 30 and the database system 20, then extracts performance information from the measured monitoring item. Namely, in the case that client application processes 30 are connected to the operating server 10 on which the database system is located without passing by way of the loopback device, the database system 20 produces, e.g., an ORACLE Shadow Process (or equivalent) to communicate the client application process 30. The produced process is a separate pipe gateway process instead of a default shadow process used by ORACLE. The pipe gateway process 15 opens, during its execution, a pipe path for communicating with the client application process 30. If the pipe path between the pipe gateway process 15 and client application processes 30 are opened normally, the pipe gateway process 15 executes the ORACLE™ shadow process, then opens a pipe path to the ORACLE™ shadow process. As a result, a function as same as an original communication between client application process 30 and ORACLE™ shadow process is performed. If the above-mentioned step is performed normally, a communication path is connected between the ORACLE™ shadow process and the client application process 30, and the communication between the two processes passes through the pipe gateway. Therefore it is possible to monitor the BEQ protocol data exchanged between the ORACLE™ shadow process and client application process 30. The pipe gateway process 15 undergoes a monitoring step as indicated in FIG. 6b.

Any SQL information and database performance information for inner auditing of the information processing system 1 and measuring performance of the database system 20 is extracted from the collected data packets. The method for monitoring a database on the IPC pipe according to the present invention is preferably executed in the operating server 10.

Hereinafter, the monitoring process according to one embodiment of the present invention is explained in detail with reference to the attached drawings.

Figure 6A:
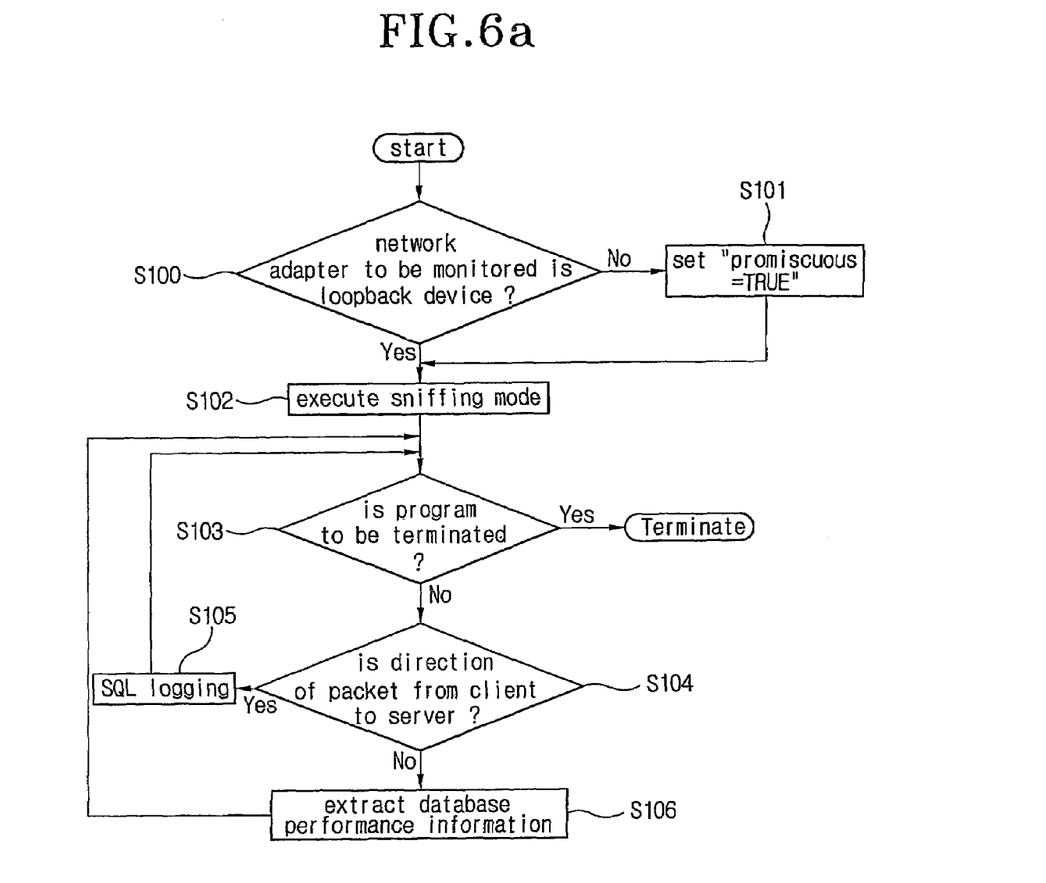
FIG. 6a is a flowchart showing a monitoring process on an Ethernet network or a loopback device according to an embodiment of the present invention.
Figure 6B:
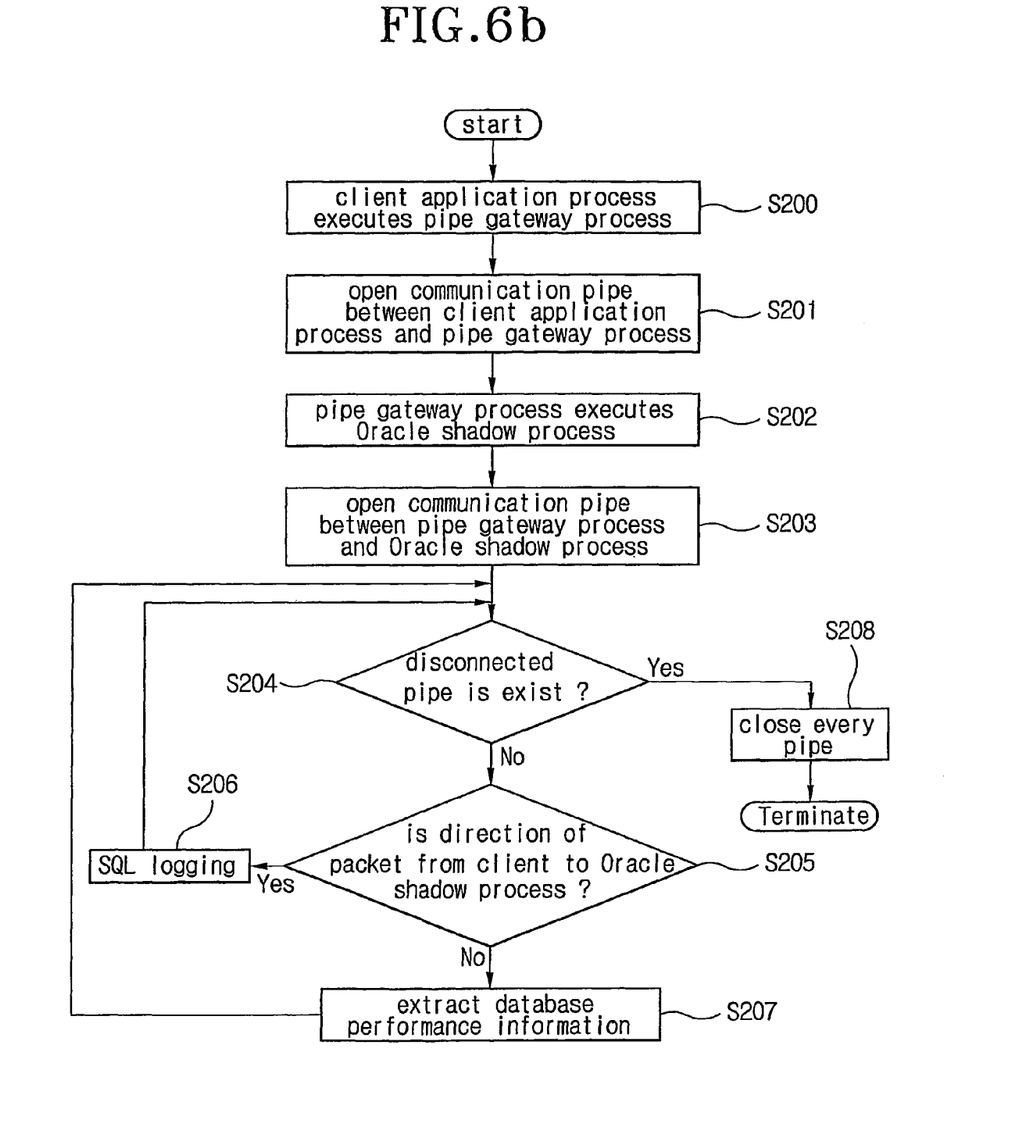
FIG. 6b is a flowchart showing a monitoring process on an IPC pipe according to an embodiment of the present invention

FIG. 6a is a flow chart showing the monitoring process on the Ethernet network or the loopback device 12 according to the present invention.

First, the monitoring process according to the present invention determines whether a network adapter to be monitored is the loopback device 12 (S100). If the network adapter is the loopback device 12, the sniffing mode is executed (S102), otherwise if the network adapter is not loopback device 12, it is the Ethernet network, therefore "promiscuous=TRUE" is set (S101) then sniffing mode is executed (S102).

Then, it is determined whether the program is terminated (S103), if the program is not terminated, it is determined whether the direction of the data packets is from client application processes 30 to the operating servers 10 (S104) If the direction of the packets is from the client application processes 30 to the operating servers 10, SQL information is extracted (S105), otherwise if the direction of the packets is not from the client application processes 30 to the operating servers 10 (e.g., from the operating servers to the client application processes), the performance information of the database system 20 in the operating servers 10 is extracted (S106).

After all SQL information and database performance information is extracted in the abovementioned step S105 or S106, it is returned to the step (S103) where whether the program is terminated is determined.

FIG. 6b is a flowchart showing the monitoring method on IPC pipe 13.

If a monitoring position is on the IPC pipe 13, client application processes 30 execute the pipe gateway process 15 according to the present invention, and a communication pipe is opened between the client application processes 30 and the pipe gateway process 15 (S201). Then, the pipe gateway process 15 executes the ORACLE™ shadow process (or equivalent) (S202), a communication pipe 13 is opened between the pipe gateway process 15 and the ORACLE™ shadow process. It is determined whether the pipe 13 is disconnected (S204), and if the pipe is not disconnected it is determined whether the direction of the data packets using BEQ protocol is from the client application processes 30 to the ORACLE™ shadow process (S205).

If the direction of the data packet is from client application processes to the ORACLE™ shadow process, any SQL information is extracted (S206), otherwise if the direction of the data packet is not from client application processes to the ORACLE™ shadow process, the performance information of the database system (20) is extracted (S207).

In the above-mentioned step S204, if the pipe 13 is disconnected, every pipe (13) is closed and the program is terminated. Further, after any SQL information and database performance information are extracted in the above-mentioned steps S206 and S207, it is returned to the step S204.

The SQL information extracted for internal auditing in the information processing system 1 according to the present invention may include SQL log information such as a data defining language (DDL) defining data and its structure of the database, a data manipulating language (DML) for processing search and correction of the data of the database, a data control language (DCL) defining authority of database user, a PLSQL, and a query related to information in the table of the database, etc.

Further, the extracted SQL information may include session information such as a user IP, a user name, a user application program (client application process) name, used hours of the client terminal 30 connected to the database system 20, and host name of the operating server etc., and may include each of the session information and SQL log information by instance. The monitoring process according to the present invention can show detailed information (returned rows, bytes, response time, server processing time etc.) by SQL (DDL, DML, DCL etc.) and any changes or variations of usage (count) etc.

The monitoring process according to the present invention shows database performance information including a mean response time between database system 20 of the operating servers 10 and client application process 30, and various status information by instance. In this status, the above-mentioned status information is an indicator provided by the database for tracking and measuring the performance of the database, and it is data of database performance statistics showing performance related to resources such as an I/O, a CPU and a memory etc.

The monitoring process according to the present invention can show a transition analysis of sent/received data packets for measuring database performance (In/Out packet count, bytes, etc.), number of user accesses by instance, a transition analysis of data packets by instance, a transition analysis of response time/server processing time by instance, detailed information analysis by used SQL (peak time analysis), etc. The monitoring process according to the present invention can explore access user by object or show the current user, session and SQL by instance, further it can be interworked with various database tuning tools.

As mentioned above, according to the present invention, when communication between the database system 20 in the operating servers 10 and the client application processes 30 is implemented on the Ethernet network, the loopback device 12 or the IPC pipe 13, data packets sent and/or received via SQL net protocol or BEQ protocol are collected by sniffing or a separate pipe gateway process without direct access to the database system 20, thus every or all SQL information and database performance information for inner auditing in information processing system 1 and measurement of database performance with no load or minimized load to the operating servers 10, the database system 20 and network. Therefore no separate connecting device for monitoring to database system 20 is needed. Therefore, the monitoring operation such as extraction of SQL information and measurement of database performance etc. related to the database system 20 in which thousands or tens of thousands of transactions per second are processed can be performed without system load.

The forgoing embodiment is merely exemplary and is not to be construed as limiting the present invention. The present teachings can be readily applied to other types of apparatuses.

The description of the present invention is intended to be illustrative, and not to limit the scope of the claims. Many alternatives, modifications, and variations will be apparent to those skilled in the art.

As explained above, according to the method for monitoring the database system without access to the database system, data packets existing between a plurality of operating server including the database system and a plurality of client application processes are collected by sniffing, then SQL information and database performance information are extracted. Therefore the SQL information and database performance information are effectively monitored with no load or minimized load to the database, the operating server and network system, and no separate connection device connected to the database system for monitoring is needed.

What is claimed is:

1. A method for monitoring a database system without access to the database system, the method comprising the steps of determining whether data packets between a plurality of operating servers including the database system and a plurality of client application processes are sent and/or received through a SQL net protocol, wherein if said data packets are sent and/or received through the SQL net protocol further comprising collecting said data packets through sniffing by a monitoring process thereby SQL information and database performance information transmitted between said operating servers and said client application processes are extracted.

2. The method according to claim 1, wherein said sniffing collects said data packets using said SQL net protocol, and is performed on an Ethernet network between said database system and the client application processes.

3. The method according to claim 1, wherein said sniffing collects said data packets using said SQL net protocol, and is performed on a loopback device between said database system and the client application processes.

4. The method according to claim 1, wherein said monitoring process comprising the steps of:
    determining whether a network adapter to be monitored is a loopback device;
    performing a sniffing mode if said network adapter is a loopback device;
    setting and performing the sniffing mode if said network adapter is not the loopback device;
    determining whether the program is to be terminated;
    determining whether the direction of the data packets is from said client application process to the operating server if the program is not to be terminated;
    extracting said SQL information if the direction of the packets is from the client application process to the operating server; and
    extracting said database performance information if the direction of the packets is not from the client application process to the operating server.

5. The method according to claim 1, wherein said monitoring process is implemented in a separate monitoring system or said operating server.

6. The method according to claim 1, wherein said SQL information includes SQL log information including one or more of data defining language (DDL), data manipulating language (DML), data control language (DCL), PLSQL and query.

7. The method according to claim 6, wherein said SQL information further includes session information such as user IP, user name, user application program, and used time of said client application process accessing said database system and host name of said operating server, and said SQL log information by session information and instance.

8. The method according to claim 1, wherein said database performance information includes data of mean response time and processing time between the database system of said operating server and said client application process, and database performance statistics by instance.

9. The method according to claim 1, wherein said database system includes a relational database management system (RDBMS).

10. A method for monitoring a database system without access to the database system, the method characterized in that when data packets between a plurality of operating servers including the database system and a plurality of client application processes are sent and/or received through a BEQ protocol, said data packets are collected by a separate pipe gateway process such that every SQL information and database performance information transmitted between said operating servers and said client application processes are extracted.

11. The method according to claim 10, wherein said pipe gateway process collects said data packets using said BEQ protocol, and is performed on an IPC pipe between said database system and the client application processes.

12. The method according to claim 10, comprising the steps of:
    said client application process executing said pipe gateway process;
    opening a communication pipe between said client application process and said pipe gateway process;
    said pipe gateway process executing a shadow process;
    opening a communication pipe between said pipe gateway process and the shadow process;
    determining whether said pipe is disconnected;
    determining whether the direction of the data packets is from said client application process to said shadow process if said pipe is not disconnected;
    extracting said SQL information if the direction of the packets is from the client application process said shadow process;
    extracting said database performance information if the direction of the packets is not from the client application process to said Oracle shadow process; and
    closing every pipe and terminating if said pipe is disconnected.

13. The method according claim 10, wherein said pipe gateway process is implemented in said operating server.

14. The method according claim 10, wherein said SQL information includes SQL log information including one or more of data defining language (DDL), data manipulating language (DML), data control language (DCL), PLSQL and query.

15. The method according to claim 14, wherein said SQL information further includes session information such as user IP, user name, user application program, and used time of said client application process accessing said database system and host name of said operating server, and said SQL log information by session information and instance.

16. The method according claim 10, wherein said database performance information includes data of mean response time and processing time between the database system of said operating server and said client application process, and database performance statistics by instance.

17. The method according to claim 10, wherein said database system is a relational database management system (RDBMS).

18. A method for monitoring a database system without access to the database system, the method characterized in that when data packets between a plurality of operating servers including the database system and a plurality of client application processes are sent and/or received through a SQL net protocol, said data packets are collected through sniffing by a monitoring process, thereby SQL information and database performance information transmitted between said operating servers and said client application processes are extracted, wherein said monitoring process comprises the steps of:

determining whether a network adapter to be monitored is a loopback device;

performing a sniffing mode if said network adapter is a loopback device;

setting and performing the sniffing mode if said network adapter is not the loopback device;

determining whether the program is to be terminated;

determining whether the direction of the data packets is from said client application process to the operating server if the program is not to be terminated;

extracting said SQL information if the direction of the packets is from the client application process to the operating server; and extracting said database performance information if the direction of the packets is not from the client application process to the operating server.

* * * * *